(12) United States Patent
Schmidt et al.

(10) Patent No.: US 10,700,806 B1
(45) Date of Patent: *Jun. 30, 2020

(54) OPTICAL TRANSCEIVER PACKAGE WITH PASSIVE THERMAL MANAGEMENT

(71) Applicant: Juniper Networks, Inc., Sunnyvale, CA (US)

(72) Inventors: Theodore John Schmidt, Gilroy, CA (US); Roberto Marcoccia, San Jose, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/375,496

(22) Filed: Apr. 4, 2019

Related U.S. Application Data

(63) Continuation of application No. 14/955,864, filed on Dec. 1, 2015, now Pat. No. 10,256,937.

(51) Int. Cl.
*H04B 10/40* (2013.01)
*H04J 14/02* (2006.01)
*H04B 10/073* (2013.01)

(52) U.S. Cl.
CPC ...... *H04J 14/0221* (2013.01); *H04B 10/0731* (2013.01)

(58) Field of Classification Search
CPC .................................................. H04B 10/503
See application file for complete search history.

(56) References Cited

U.S. PATENT DOCUMENTS

| 8,587,945 B1 | 11/2013 | Hartmann et al. |
| 10,256,937 B1* | 4/2019 | Schmidt ................... G02B 6/00 |
| 2013/0279115 A1 | 10/2013 | Blumenthal |
| 2015/0179617 A1 | 6/2015 | Lin et al. |
| 2016/0248521 A1 | 8/2016 | Streshinsky et al. |

OTHER PUBLICATIONS

Prosecution history of U.S. Appl. No. 14/955,864 dated Dec. 21, 2016 through Nov. 23, 2018, 114 pp.

* cited by examiner

*Primary Examiner* — Shi K Li
(74) *Attorney, Agent, or Firm* — Shumaker & Sieffert, P.A.

(57) ABSTRACT

An article may include an optical transceiver package, which may include a photonics component mounted in the optical transceiver package. The photonics component may generate heat in an operational state. The optical transceiver package may include a sealed thermal chamber that maintains the photonics component between a lower predetermined working temperature and a higher predetermined working temperature. The sealed thermal chamber may include a material that exhibits a first thermal conductivity below a lower predetermined threshold temperature and a second thermal conductivity higher than the first thermal conductivity above an upper predetermined threshold temperature. A method may include retaining the generated heat to raise the photonics component above a lower predetermined working temperature, and conducting the generated heat away from the optical transceiver package to lower the photonics component below an upper predetermined working temperature. A system may include the optical transceiver package mounted to a printed circuit board.

20 Claims, 4 Drawing Sheets

OPTICAL TRANSCEIVER PACKAGE WITH PASSIVE THERMAL MANAGEMENT

This application is a continuation of U.S. application Ser. No. 14/955,864, filed Dec. 1, 2015, the entire content of which is hereby incorporated by reference.

TECHNICAL FIELD

This disclosure relates to optical communication, and more particularly, to thermal management in optical communication systems.

BACKGROUND

Optical communication systems may include photonics components that may exhibit unwanted changes in operating parameters with changes in temperature. Therefore, optical communication systems may utilize heating devices, cooling devices, or both to stabilize the temperature of the photonics component. Some optical transceivers may include thermoelectric coolers (TEC) to regulate the local temperature of the photonics components, decoupling the local temperature of the photonics components from the ambient temperature around the optical transceiver. TECs are active devices (since they require electrical power and closed loop control) that rely on the Peltier effect in semiconductor p-n junctions to provide heating and cooling capabilities relative to ambient temperature. In addition to requiring power and active control, TECs may be costly and power inefficient devices. Temperature stabilization may also be accomplished by using a so-called "ovenized" approach to thermal stabilization, where the photonics components are heated so they are always at an elevated temperature relative to the ambient environment. This "ovenized" approach utilizes electrical power and closed loop control of the heaters.

Alternatively, optical transceivers may include uncooled photonics components, such as uncooled lasers. Uncooled lasers may include, for example, a directly modulated laser (DML) or an electro-absorption modulated laser (EML). Uncooled lasers may also be used in conjunction with a modulator capable of operating over a wide wavelength range, for example, a Mach-Zhender Modulator (MZM, fabricated in silicon or III-V material). These MZMs may have an operating point, for example, a modulator bias voltage, that may be adjusted through closed loop control in order to operate over the wavelength range of the laser. For uncooled lasers, the temperature of the laser is allowed to vary, which results in the wavelength of the laser varying. This may be acceptable for applications requiring only a few optical channels per fiber and where the large optical bandwidth of the transmission medium (e.g. optical fiber) can be utilized. An example is transceivers operating over the so-called Course Wavelength Division Multiplexing (CWDM) optical channel plan (20 nm channel spacing).

SUMMARY

Variations in photonic component properties with temperature may not be acceptable in various applications, and therefore, a temperature management system may be utilized. This disclosure describes passive (that may not require control or power) thermal management of photonics components.

In an example, an article includes an optical transceiver package. The optical transceiver package includes a photonics component mounted in the optical transceiver package. The photonics component is configured to generate heat in an operational state. The optical transceiver package includes a sealed thermal chamber configured to maintain the photonics component between a lower predetermined working temperature and a higher predetermined working temperature. The sealed thermal chamber includes a material that exhibits a first thermal conductivity below a lower predetermined threshold temperature and a second thermal conductivity higher than the first thermal conductivity above an upper predetermined threshold temperature.

In an example, a system includes a printed circuit board, and an optical transceiver package mounted to the printed circuit board. The optical transceiver package includes a photonics component mounted in the optical transceiver package. The photonics component is configured to generate heat in an operational state. The optical transceiver package includes a sealed thermal chamber configured to maintain the photonics component between a lower predetermined working temperature and a higher predetermined working temperature. The sealed thermal chamber includes a material that exhibits a first thermal conductivity below a lower predetermined threshold temperature and a second thermal conductivity higher than the first thermal conductivity above an upper predetermined threshold temperature.

In an example, a technique includes operating a photonics component mounted in an optical transceiver package. The optical transceiver package includes a sealed thermal chamber including a material. The photonics component generates heat in an operational state. The technique includes retaining the generated heat within the transceiver package to raise the photonics component above a lower predetermined working temperature when the material is below a lower predetermined threshold temperature. The material exhibits a first thermal conductivity below the lower predetermined threshold temperature. The technique includes conducting the generated heat away from the transceiver package to lower the photonics component below an upper predetermined working temperature when the material is above an upper predetermined threshold temperature. The material exhibits a second thermal conductivity higher than the first thermal conductivity above the lower predetermined threshold temperature.

The details of one or more aspects of the disclosure are set forth in the accompanying drawings and the description below. Other features, objects, and advantages of the disclosure will be apparent from the description and drawings, and from the claims.

DETAILED DESCRIPTION

Optical transceivers may be exposed a wide temperature range in use due to the changes in temperature of the system in which the optical transceivers are used. The opto-electronic properties of components of an optical transceiver may depend on the local temperature of the elements. Examples include a change in the wavelength of a distributed feedback (DFB) laser with temperature (which may change by about 0.1 nm/° C.), a shift in the operating point of an electro-absorption modulator (EAM) with temperature (which may change by about 0.6 nm/° C.), or the like.

The disclosure describes an optical device that includes a sealed thermal chamber that may include a material that exhibits a relatively lower thermal conductivity below a first temperature $T_1$ and a relatively high thermal conductivity above a second temperature $T_2$. $T_2$ may be greater than $T_1$ by, for example, between about 5° C. and about 10° C.

The sealed thermal chamber may be purely passive, with no power or control required, and may be integrated into the packaging of the optical device. For example, the sealed thermal chamber may be placed between an optical device and a heat sink. Example sealed thermal chambers may provide thermal insulation of the optical devices at temperatures below $T_1$ and may provide thermal conductivity to the ambient environment at temperatures above $T_2$. This may allow the optical device to self-heat to $T_1$ when the temperature of the optical device is less than approximately $T_1$. At optical device temperatures greater than $T_2$, the sealed thermal chamber may act as a thermal conductor and transmit heat from the optical device, allowing the optical device to be maintained at near the temperature $T_2$. In some examples, the ambient temperature surrounding the optical device may be near $T_2$, such as between $T_1$ and $T_2$, or about $T_2$, or slightly more than $T_2$. In some examples, the sealed thermal chamber may result in optical device temperatures that are within, for example, 5° C. of ambient when either the ambient environment or device temperature is approximately at or above $T_2$.

Thus, example sealed thermal chambers may provide a purely passive solution to constrain the operational temperature range for the optical devices, reducing the variability in optical properties or operating characteristics compared to optical devices that operate over a wider temperature range. This could be utilized to enable, for example, more optical channels in a given optical spectrum range, to improve the stability of optical performance over ambient temperature variations, or the like.

Figure 1B:
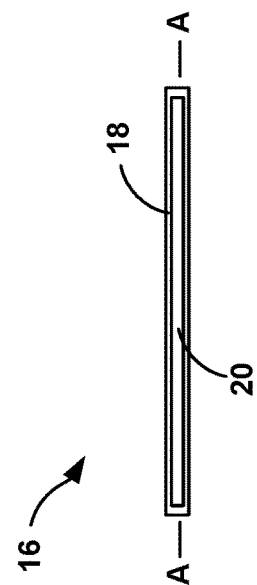
FIG. 1B is a conceptual and schematic diagram illustrating a cross-sectional view of a sealed thermal chamber in accordance with one or more examples described in this disclosure.
Figure 1A:
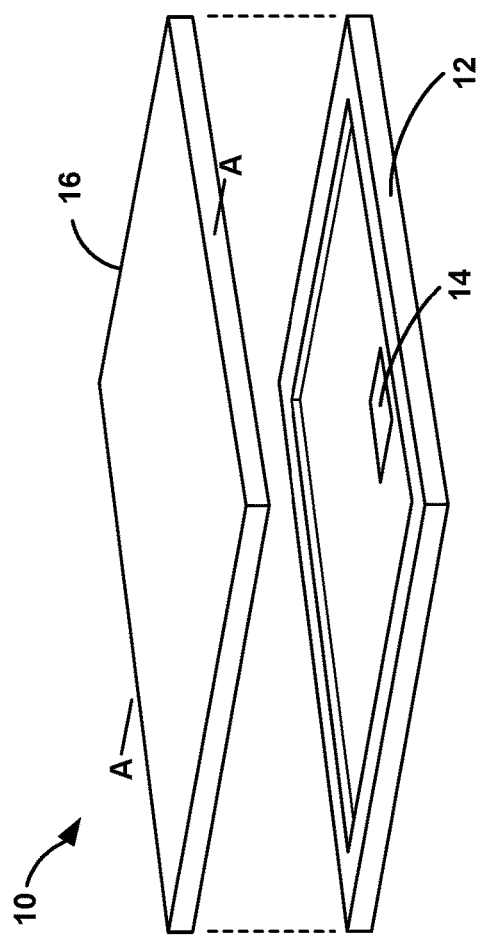
FIG. 1A is a conceptual and schematic diagram illustrating an optical transceiver package including a sealed thermal chamber in accordance with one or more examples described in this disclosure.

FIG. 1A is a conceptual and schematic diagram illustrating an optical transceiver package 10 including a sealed thermal chamber 16. FIG. 1B is a conceptual and schematic diagram illustrating a cross-sectional view of sealed thermal chamber 16.

Optical transceiver package 10 may include a base 12, a photonics component 14, and sealed thermal chamber 16. Base 12 may include a rigid chassis and a printed circuit board. For example, the chassis may include a metal, a ceramic, or an alloy. The printed circuit board may include organic or ceramic dielectrics, and metal or alloy traces.

Optical transceiver package 10 also may include a photonics component 14. For example, photonics component 14 may include an application specific integrated circuit (ASIC). Photonics component 14 may be mounted in optical transceiver package 10, for example, to a printed circuit board of base 12 as shown in FIG. 1A. While the example optical transceiver package 10 of FIG. 1A is shown as including a single photonics component 14, in some examples, optical transceiver package 10 may include multiple photonics components. For example, photonics component 14 may include single or multiple units of one or more of a laser, a distributed feedback laser, a tunable laser, a pump laser, an MZM laser, a III-V laser, a modulator, an external modulator, a data photodiode, a multiplexer, a demultiplexer, or the like.

Photonics component 14 may generate heat when operating. For example, photonics component 14 may include a laser that generates heat while lasing. In some examples, photonics component 14 may exhibit a temperature-dependent operating characteristic, for example, a wavelength. For example, photonics component 14 may include a band-gap material that exhibits changes in operating characteristics with temperature. In some examples, the temperature-dependent operating characteristic may change with temperature, for example, at a rate between about 0.1 nm/° C. and about 1 nm/° C. However, photonics component 14 may be expected to operate such that the operating characteristic is within a predetermined operating range, for example, a preferred operating range. For example, photonics component 14 may include a laser, and a wavelength of the laser may be preferred to be within a predetermined wavelength range.

In some examples, photonics component 14 operates so that the temperature-dependent operating characteristic is within a predetermined operating range when the temperature of photonics component 14 is between a lower predetermined working temperature and an upper predetermined working temperature. For example, a wavelength emitted by photonics component 14 may reduce beyond a lower bound or increase beyond an upper bound of the predetermined operating range when the temperature of photonics component 14 is below the lower predetermined working temperature or above the upper predetermined working temperature, respectively. In some examples, the lower predetermined working temperature and the upper predetermined temperature may be determined based on the expected operating characteristic of photonics component 14. For example, the lower predetermined working temperature may be associated with a minimum preferred value of an operating characteristic, while the upper predetermined working temperature may be associated with a maximum preferred value of an operating characteristic.

Sealed thermal chamber 16 may include a container 18 enclosing material 20. Container 18 may include a metal, an alloy, ceramic, or any other material that conducts heats and can retain material 20 within sealed thermal chamber 16. Container 18 may initially be open, so that material 20 may be introduced into the sealed volume, after which container 18 may be sealed. Thus, container 18 may enclose a sealed volume that may be occupied by material 20.

Material 20 may exhibit a first thermal conductivity at temperatures below a lower predetermined threshold temperature and a second thermal conductivity higher than the first thermal conductivity at temperatures above an upper predetermined threshold temperature. Material 20 may include a gas, a liquid, a vapor, a solid, a phase change material, or a composition that exhibits changes in thermal conductivity with temperature, or their combinations. For example, material 20 may include water, gallium, organic compounds, paraffins, inorganic salt hydrates, fused salt eutectics, or metals. In some examples, the lower predetermined threshold temperature may be between about 0° C. and about 40° C., and the upper predetermined threshold temperature may be between about 40° C. and about 80° C. In some examples, a pressure in sealed thermal chamber 16 may be adjusted to provide a change in thermal conductivity at predetermined temperatures, for example, by changing temperatures associated with one or more phase changes. In some examples, material 20 may include additives or fillers that may affect thermal conductivities, for example, by changing temperatures associated with one or more phase changes.

Dimensions of sealed thermal chamber 16, including height, width, length, chamber wall thickness, or other geometric parameters such as perimeter shape and length of major surfaces of sealed thermal chamber 16, may also be adjusted. For example, a change in one or more of height, width, or length of sealed thermal chamber 16 may change the amount of material 20 that may occupy sealed thermal chamber 16. A change in a surface area of a major surface of sealed thermal chamber 16 may change an amount of heat flowing between sealed thermal chamber 16 and photonics component 14. A change in the chamber wall thickness may change heat capacity of sealed thermal chamber. One or more of these parameters may therefore change overall heat conduction between sealed thermal chamber 16 and photonics component 14, or sealed thermal chamber 16 and the ambient environment.

Thus, in examples, sealed thermal chamber 16 including material 20 may act as a thermal valve, and may resist heat conduction across sealed thermal chamber 16 below the lower predetermined threshold temperature and permit heat conduction across sealed thermal chamber 16 above the upper predetermined threshold temperature. For example, material 20 may regulate heat flowing across major surfaces of sealed thermal chamber 16.

Thus, in some examples, when the temperature of material 20 is lower than the lower predetermined threshold, material 20 may exhibit the first thermal conductivity, which may be sufficiently low to retain at least some heat within optical transceiver package 10. In some examples, when the temperature of material 20 is higher than the upper predetermined threshold, material 20 may exhibit the second thermal conductivity, which may be sufficiently high to conduct away at least some heat from optical transceiver package 10 (and more heat than when the temperature of material 20 is lower than the lower predetermined threshold). For example, the upper predetermined threshold temperature may be greater than the lower predetermined threshold temperature by at least about 5° C., such as between about 5° C. and about 10° C., and sealed thermal chamber 16 may allow heat to flow across at temperatures above the upper threshold temperature and reduce heat flowing across at temperatures greater below the lower predetermined threshold temperature.

Sealed thermal chamber 16 is in thermal contact with photonics component 14. For example, a surface of sealed thermal chamber 16 may be in direct contact with a surface of photonics component 14, and heat may conduct across the interface formed by the respective contacting surfaces. In some examples, a thermal interface material may be disposed between sealed thermal chamber 16 and photonics component 14. For example, a layer of thermal grease may be disposed between a surface of photonics component 14 and a surface of sealed thermal chamber 16, such that heat may conduct between photonics component 14 and sealed thermal chamber 16 across the layer of thermal grease. In some examples, the thermal interface material may include any structure disposed between a surface of photonics component 14 and a surface of sealed thermal chamber 16. For example, the thermal interface material may include a graphite sheet, a thermal pad, a heat spreader, a thermal gel, a thermal tape, a thermal adhesive, or other material or structure that conducts heat.

While sealed thermal chamber 16 is disposed above photonics component 14 in example optical transceiver package 10 illustrated in FIG. 1A, in other examples, thermal chamber 16 may be disposed at other locations relative to photonics component 14. In some examples, sealed thermal chamber 16 may be in thermal contact with a plurality of photonics components. In examples, optical transceiver package 10 may include a lid including sealed thermal chamber 16. In examples, transceiver package 10 may include a thermal grease layer (not shown) between the photonics component and a surface of the sealed thermal chamber, to promote heat transfer. In examples, sealed thermal chamber 16 may be disposed between a heat sink and optical transceiver package 10. While sealed thermal chamber 16 is illustrated as having a rectangular surface in example optical transceiver package 10 of FIG. 1A, in other examples, sealed thermal chamber 16 may have a surface of any shape, including circular, oval, square, triangular, polygonal or any other suitable shape, and may have any suitable thickness or height. In some examples, the boundary defined by a major surface of sealed thermal chamber 16 may conform to the boundary defined by base 12. In other examples, a major surface of sealed thermal chamber 16 may not conform to base 12, and may extend beyond or within a boundary defined by base 12.

While a single sealed thermal chamber 16 is illustrated in FIG. 1A, in some examples, optical transceiver package 10 may include a plurality of sealed thermal chambers may be placed in contact with a plurality of photonics components. For example, each sealed thermal chamber of the plurality of sealed thermal chambers may be in thermal contact with a corresponding photonics component of a plurality of photonics components. Each sealed thermal chamber of the plurality of sealed thermal chambers may include material having a composition that may be the same as or that may differ from the composition of material in another sealed thermal chamber of the plurality of sealed thermal chambers. Thus, each sealed thermal chamber of the plurality of sealed thermal chamber may maintain a photonics component of the plurality of photonics component within a predetermined temperature range selected for that particular photonics component.

As described above, sealed thermal chamber 16 may maintain photonics component 14 between or near the lower predetermined working temperature and the higher predetermined working temperature. For example, the first thermal conductivity of material 20 may be sufficiently low to retain at least some heat generated by photonics component 14 within optical transceiver package 10, such that the generated heat raises the temperature of photonics component 14 to a temperature above the lower predetermined working temperature. The second thermal conductivity of material 20 may be sufficiently high to conduct at least some generated heat away from the optical transceiver package such that the temperature of photonics component 14 is maintained below, at, or slightly above the upper predetermined working temperature. In some examples, material 20 may be selected such that the lower predetermined threshold temperature is substantially the same as the lower predetermined working temperature and the upper predetermined threshold temperature is substantially the same as the upper predetermined working temperature.

Although FIGS. 1A and 1B illustrate a first example configuration for an optical transceiver package 10, optical transceiver packages that include a sealed thermal chamber in accordance with this disclosure may take any suitable shape. For example, FIG. 1C is a conceptual and schematic diagram illustrating an optical transceiver package 30 including a sealed thermal chamber 16c. Sealed thermal chamber 16c may be similar to sealed chamber 16 described above with reference to FIGS. 1A and 1B. Butterfly package 32 may include a base 34 including mounting holes 35 to mount butterfly package 32 to a printed circuit board (not shown). Butterfly package 32 may include conductive leads 36 that may be connected to corresponding leads or sockets on the printed circuit board. Butterfly package 32 may include an optic fiber connection 38 that transmits an optical signal to butterfly package 32 through a window and a lens. Sealed thermal chamber 16c may maintain a photonics component (not shown) within butterfly package 32 between the lower predetermined working temperature and the upper predetermined working temperature. For example, butterfly package 32 may include a Kovar body containing a photodiode mounted on a silicon submount. While conductive leads 36 include a 14-pin configuration in the example butterfly package 30 illustrated in FIG. 1C, conductive leads 36 may include any number of pins in other example butterfly packages, for example, 7-pin, 13-pin, 20-pin, 26-pin or any other number of pins.

Figure 1D:
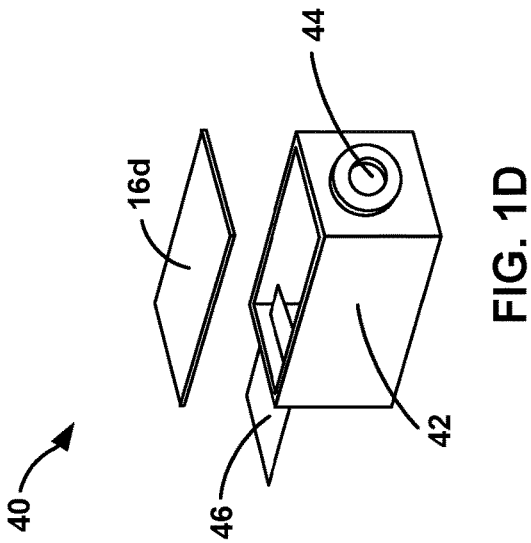
FIG. 1D is a conceptual and schematic diagram illustrating an optical transceiver package including a sealed thermal chamber in accordance with one or more examples described in this disclosure.
Figure 1C:
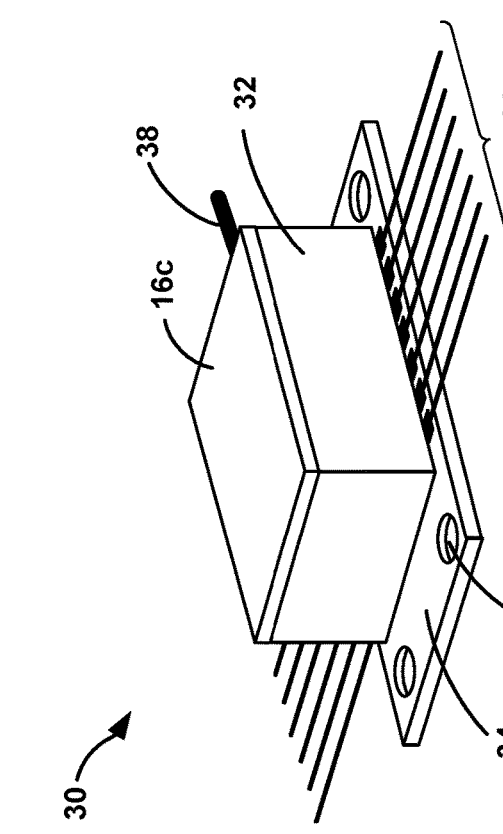
FIG. 1C is a conceptual and schematic diagram illustrating an optical transceiver package including a sealed thermal chamber in accordance with one or more examples described in this disclosure.

FIG. 1D is a conceptual and schematic diagram illustrating another example optical transceiver package 40 including a sealed thermal chamber 16d. Optical transceiver package 40 may include a TOSA/ROSA (transmitter optical sub-assembly/receiver optical sub-assembly) package, including window 44 that may allows lights to pass to or from optical transceiver package 40. Window 44 may include a lens. Window 44 may be dimensioned to allow a sleeve and a receptacle for connecting a fiber optic cable to be connected to optical transceiver package 40. Optical transceiver package 40 may include a connector 46 that may include pins (not shown) for electrically connecting optical transceiver package 40 to a corresponding receiver on a printed circuit board, for example, a port. For example, optical transceiver package 40 may include a Kovar body having window 44 at the front and a flex contact and a ceramic contact strip at the rear. Sealed thermal chamber 16d may maintain a photonics component (not shown) within optical transceiver package 40 between the lower predetermined working temperature and the upper predetermined working temperature. For example, optical transceiver package 40 may include a photodiode mounted on a silicon submount.

Thus, example articles described above may provide thermal management of photonics components by reducing a temperature range experienced by the photonics components. This may result in less variability in the optical properties of the photonics components, which may be leveraged to pack optical channels closer together and/or to improve the optical performance of the individual channel. In some examples, the sealed thermal chamber may additionally or alternatively lower power consumption when compared to TEC and "ovenized" approaches; be purely passive approach to thermal stabilization, where no need for the closed loop control of the TEC or heaters used to "ovenize" is required, and there is no need for electrical connections; be compatible with standard IC and optoelectronic packaging technologies and processes, or the like. Example articles described above may be used in optical communication systems described with reference to FIGS. 2 and 3 below.

Figure 2:
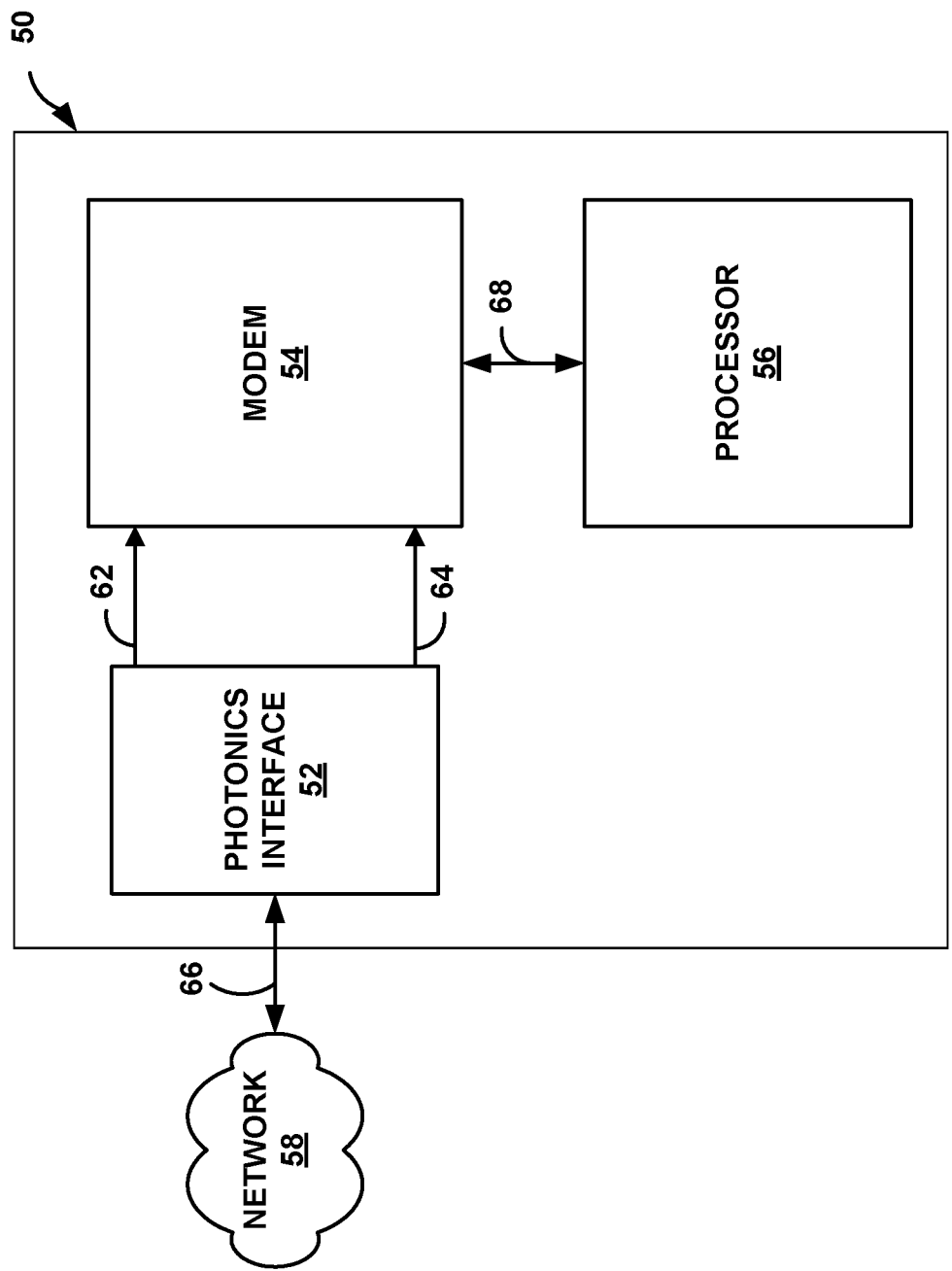
FIG. 2 is a block diagram illustrating a transceiver in an optical communication system in accordance with one or more examples described in this disclosure.

For example, FIG. 2 illustrates an optical communication system in which sealed thermal chamber 16 of FIG. 1A may be utilized. FIG. 2 is a block diagram illustrating a network device 50 of an optical communication system. In some examples, network device 50 may include a transceiver. Network device 50 includes photonics interface 52 coupled to modem 54 and a controller. An example of the controller is processor 56 illustrated in FIG. 2. Photonics interface 52 is a hardware interface that includes components for transmission and reception of optical data. Examples of modem 54 and the controller include, but are not limited to, a digital signal processor (DSP), a general purpose microprocessor, an ASIC, a field programmable gate array (FPGA), a combination thereof, or other equivalent integrated or discrete logic circuitry. For purposes of illustration, modem 54 may be a DSP, and the controller, an example of which is processor 56, may be a general purpose microprocessor or an ASIC. Network device 50 may include one or more of optical transceiver package 10 of FIG. 1A, optical transceiver package 30 of FIG. 1C, or optical transceiver package 40 of FIG. 1D, or an optical transceiver package according to examples described in the disclosure. For example, photonics interface 52 may include optical transceiver package 10 mounted on a circuit board. Sealed thermal chamber 16 may thus maintain operating characteristics of photonics component 14 within photonics interface 52.

Network device 50 is part of an optical communication system such as a wavelength-division multiplexing (WDM) system, including a dense wavelength division multiplexing (DWDM) system. However, aspects of this disclosure are not limited to WDM systems. For purposes of illustration only and for ease of description, the examples are described in context of a WDM system.

In a WDM system, modem 54 of network device 50 receives electrical data streams from multiple devices such as switches or routers that are serialized together. Modem 54 encodes the received data streams utilizing any one of a variety of modulation schemes, and transmits the modulated data as electrical data streams to photonics interface 52. Photonics interface 52 converts the electrical data streams to an optical signal for further transmission into network 58 via optical link 66. Network 58 may be any type of network that allows different devices to communicate with one another. For instance, examples of network 58 include, but are not limited to, a wide area network (WAN) or the Internet.

In the reverse, photonics interface 52 receives optical signals via optical link 66 from network 58, and converts the optical signals to electrical data streams. Modem 54 receives the electrical data streams from photonics interface 52, and demodulates the electrical data streams to generate demodulated electrical data streams. Modem 54 or some other device deserializes the demodulated electrical data stream into a plurality of electrical data streams, and transmits each of the plurality of electrical data streams to respective routers and switches.

The example illustrated in FIG. 2 is one type of optical system in which the articles and techniques described in this disclosure may be implemented. In general the articles and techniques described in this disclosure may be implemented in any type of optical communication systems using any type of optical modulation scheme. For example, the articles and techniques described in this disclosure may be used in coherent optical communication systems. For instance, photonics interface 52, modem 54, and processor 56 may be considered as being part of a coherent optical communication system. While coherent optical systems are described in examples below, example articles, systems and techniques described in this disclosure may be used in optical communications systems that utilize other modulation schemes, for example, on-off keying (OOK) or amplitude-shift keying (ASK). While the example of FIG. 2 includes modem 54, the articles and techniques described in this disclosure may be used in optical communication systems that may not include a modem, or that may include other components such as a serializer/deserializer (SERDES).

Coherent optical communication systems refer to optical systems that utilize both magnitude and phase information for transmitting and receiving data such as for phase-shift keying modulation (e.g., binary phase shift keying, BPSK, or quadrature phase shift keying, QPSK modulation) or for M-ary Quadrature Amplitude Modulation (M-QAM). For instance, coherent optical communication systems may require using a carrier phase reference generated at photonics interface 52 for the reception of data streams from network 58. For example, as illustrated in more detail with respect to FIG. 3, photonics interface 52 may include lasers, phase shifting optical hardware, and optical hybrid mixers to convert the received optical signal into pairs of data streams for transmission to modem 54. Photonics components within photonics interface 52 may generate heat in an operational state, which may affect the respective operating characteristics of the photonic components, and which may ultimately affect the operation of photonics interface 52. Therefore, sealed thermal chamber 16 of FIG. 1A may be utilized to maintain photonics components in an acceptable temperature range and reduce variation in the respective operating characteristics of the photonics components in photonics interface 52, as described with reference to FIG. 3 below.

Figure 3:
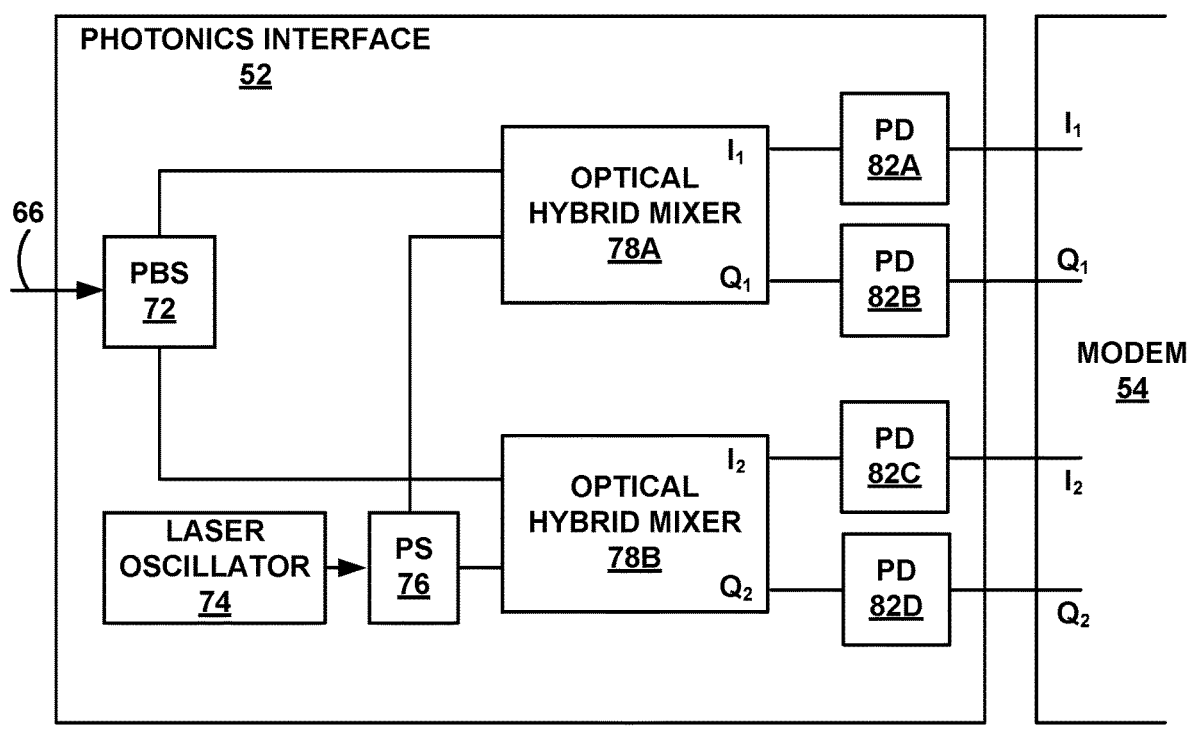
FIG. 3 is a block diagram illustrating examples of photonic components within a photonics interface.

FIG. 3 is a block diagram illustrating examples of photonics components within the photonics interface 52. For example, FIG. 3 illustrates components of photonics interface 52 that receive an optical signal from network 58 via optical link 66, convert the optical signal into $I_1Q_1$ data streams 62 and $I_2Q_2$ data streams 64, and transmit the $I_1Q_1$ data streams 62 and $I_2Q_2$ data streams 64 to modem 54.

Furthermore, the components of photonics interface 52 are illustrated for PM-QPSK modulation (polarization multiplexed quadrature phase-shift keying). Photonics interface 52 may include additional, fewer, or different components than those illustrated based on the desired PM-QPSK modulation. In some examples, photonics interface 52 may include components for BPSK modulation, M-QAM where M>4, and Orthogonal frequency-division multiplexing (OFDM). These components may be similar or different from the components illustrated in FIG. 3.

As illustrated in FIG. 3, the receive photonics of photonics interface 52 include polarization beam splitter (PBS) 72, laser oscillator 74, polarization splitter (PS) 76, optical hybrid mixers 78A and 78B, and photo-detectors (PDs) 82A-82D. PDs 82A-82D convert the magnitude of the optical signal to an electrical representation. PBS 72 receives an optical signal from network 30 via optical link 26 and splits the received optical signal into first and second optical signals with nominally orthogonal polarization (e.g., substantially orthogonal polarization). Each one of optical hybrid mixers 78A and 78B receive respective optical signals from the first and second nominally orthogonal optical signals from PBS 72.

The receive photonics also include local oscillator 74, which is a laser. Local oscillator 74 provides the phase reference required in coherent systems to recover the PM-QPSK optical waveform that photonics interface 52 receives. In some examples, local oscillator 74 may be a free running oscillator. For example, the laser signal outputted by local oscillator 74 may not need to be phase-locked with the optical signal that PBS 72 receives.

Polarization splitter (PS) 76 receives the laser from local oscillator 74 and splits the light into (at least) first and second light paths. As illustrated, each one of optical hybrid mixers 78A and 78B receive respective local oscillator light from the first and second light paths from the PS 76. In some examples, the location of PBS 72 and PS 76 may be swapped with no loss of functionality, provided the light from local oscillator 74 is split into two nominally orthogonally polarized lightwaves.

Optical hybrid mixers 78A and 78B each mix the respective optical signals from PBS 76 with the respective local oscillator lightwave reference from PS 76 and output optical data stream representing in-phase (I) and quadrature-phase (Q) components of the PM-QPSK modulated signal. For example, optical hybrid mixer 78A outputs $I_1$ and $Q_1$ optical data streams. Optical hybrid mixer 78B outputs 12 and $Q_2$ optical data streams. In some examples, optical hybrid mixers 78A and 78B may be 90 degree optical hybrid mixers. Also, in some examples, each one of the $I_1$, $Q_2$, $I_2$, and $Q_2$ data streams may be differentially encoded data streams.

Photo-detectors 82A-82D receive respective ones of the $I_1$, $Q_2$, $I_2$, and $Q_2$ optical data streams and convert these optical signals into electrical signals (e.g., the $I_1$, $Q_1$, $I_2$, and $Q_2$ data streams that processor 56 receives). Photo-detectors 82A-82D may be composed of a single photo-diode or a pair of nominally balanced photo-diodes. A transimpedence amplifier (TIA) element for each photo-detector may used to convert photo-current from the photo-diode(s) to a voltage representation. However, the inclusion of TIA elements may not be necessary in every example. The electrical output of each photo-detector in 82A-82D can be single-ended or differential electrical signals. In some examples, the TIA elements may include automatic gain control (AGC) amplifiers, or the AGC amplifiers may be external to the TIA elements. The AGC amplifiers may nominally maintain output electrical voltage amplitude/swing for varying input electrical current amplitude/swings.

In this manner, the receive photonics of photonics interface 52 convert the PM-QPSK modulated optical signal into the electrical I and Q data stream pairs (e.g., the $I_1$, $Q_1$, $I_2$, and $Q_2$ data streams) representing the optical PM-QPSK signal for further processing by modem 54 and processor 56. For example, modem 54 receives the $I_1$, $Q_1$, $I_2$, and $Q_2$ electrical data stream pairs from photo-detectors 82A-82D through the $I_1Q_1$ data streams 62 and $I_2Q_2$ data streams 64. The $I_1Q_1$ data streams 62 and $I_2Q_2$ data streams 64 that photonics interface 52 outputs include electrical representation of the chromatic dispersion.

Photonics interface 52 may include one or more of optical transceiver package 10 of FIG. 1A, optical transceiver package 30 of FIG. 1C, or optical transceiver package 40 of FIG. 1D, or an optical transceiver package according to examples described in the disclosure. For example, photonics interface 52 may include optical transceiver package 10 mounted on a circuit board. Sealed thermal chamber 16 may thus maintain operating characteristics of photonics component 14 within photonics interface 52. For example, optical transceiver package 10 may include laser oscillator 74 of photonics interface 52, and sealed thermal chamber 16 may maintain operating characteristics of laser oscillator 74, for example, a wavelength of laser oscillator 74. Other components of photonics interface 52 may be disposed in other example optical transceiver packages. For example, each photo-detector of photo-detectors 82A-82D may be disposed within optical transceiver package 30, having an example butterfly package form factor.

Figure 4:
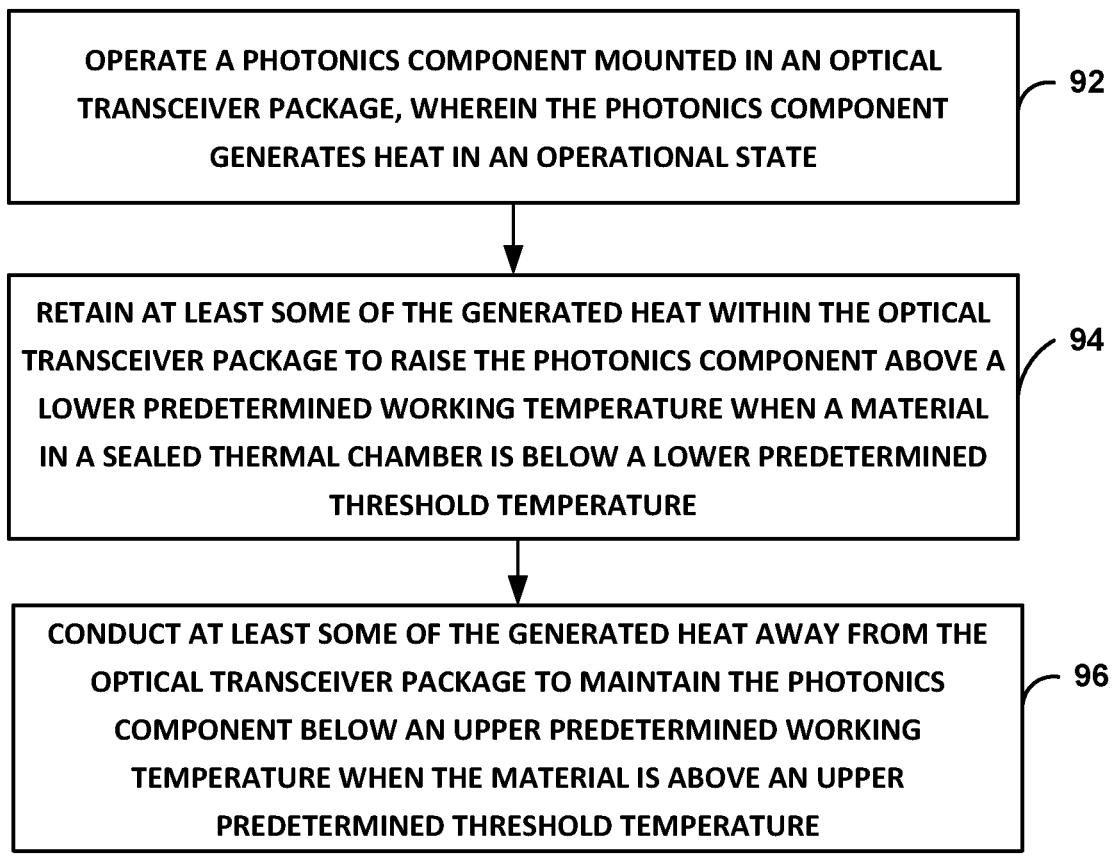
FIG. 4 is a flowchart illustrating an example technique in accordance with one or more aspects of this disclosure.

FIG. 4 is a flowchart illustrating an example technique in accordance with one or more aspects of this disclosure. For example, the technique illustrated in FIG. 4 may be applicable to temperature management of laser oscillator 74 or another photonics component. For purposes of illustration only, reference is made to FIGS. 1 through 3. The technique of FIG. 4 includes operating photonics component 14 mounted in optical transceiver package 10 (92). Operating photonics component 14 may include supplying power to photonics component 14, modulating the power supplied to photonics component 14, for example, modulating a current flowing through or a voltage applied across photonics component 14, or the like. As discussed above, operating photonics component 14 may cause photonics component 14 to generate heat. For example, lasers may generate heat as a consequence of laser pumping, which may be dissipated to the surroundings.

The technique of FIG. 4 also include, retaining at least some of the heat generated by photonics component 14 within optical transceiver package 10 to raise the photonics component above a lower predetermined working temperature when material 20 in sealed thermal chamber 16 is below a lower predetermined threshold temperature (94). For example, base 12 and sealed thermal chamber 16 may retain or at least some or substantially all heat generated by photonics component 14 within optical transceiver package 10. The retained heat may cause the temperature of photonics component 14 to increase, for example, raising the temperature of photonics component 14 above the lower predetermined working temperature. In some examples, the lower predetermined working temperature may define a lowest temperature at which the operating characteristics of photonics component 14, for example, a wavelength, may be acceptable. Thus retaining the generated heat when the temperature of material 20 within sealed thermal chamber 16 is below the lower predetermined threshold temperature may help maintain the operating characteristic of photonics component 14 at an acceptable range.

When material 20 in sealed thermal chamber 16 is below the lower predetermined threshold temperature, sealed thermal chamber 16 may prevent at least some heat generated by photonics component 10 from dissipating from optical transceiver package 10. For example, material 20 may exhibit a sufficiently low heat conductivity when material 20 is below the lower predetermined threshold temperature, such that sealed thermal chamber 16 may reduce an amount of or substantially prevent heat from flowing across sealed thermal chamber 16, or may at least sufficiently prevent heat from flowing across sealed thermal chamber 16, so that at least some heat is retained within optical transceiver package 10, which raises the temperature of photonics component 14. In some examples, the lower predetermined threshold temperature may be the same as the lower predetermined working temperature. In some examples, the lower predetermined threshold temperature may be near the lower predetermined working temperature, for example, ±1° C., ±5° C., or ±10° C. relative to the lower predetermined working temperature.

In some examples, operating characteristics of photonics component 14 are also unacceptable when photonics component 14 is above an upper predetermined working temperature. Hence, maintaining or lowering the temperature of photonics component 14 below the upper predetermined working temperature may help maintain operating characteristics of photonics component 14 within an acceptable range. In some examples, the technique of FIG. 4 includes conducting at least some heat generated by photonics component away from optical transceiver package 10 to maintain or lower photonics component 14 below the upper predetermined working temperature (96). For example, at least sufficient heat may be conducted away from optical transceiver package 10 to lower or maintain the temperature of photonics component 14 below the upper predetermined working temperature.

Sealed thermal chamber 16 may allow at least some heat generated by photonics component 10 to dissipate, conduct, or flow away from optical transceiver package 10, when material 20 in sealed thermal chamber 16 is above an upper predetermined threshold temperature. For example, material 20 may exhibit a sufficiently high heat conductivity when material 20 is above the upper predetermined threshold temperature, such that sealed thermal chamber 16 may allow at least some, e.g., substantially all, heat to flow across sealed thermal chamber 16. Material 20 may exhibit a sufficiently high thermal conductivity at temperatures above the upper predetermined threshold temperature to allow sufficient heat to flow across sealed thermal chamber 16 to substantially maintain the temperature of photonics component below the upper predetermined working temperature. In some examples, the upper predetermined threshold temperature may be the same as the upper predetermined working temperature. In some examples, the upper predetermined threshold temperature may be near the upper predetermined working temperature, for example, ±1° C., ±5° C., or ±10° C. relative to the upper predetermined working temperature.

While, in some examples, the temperature of photonics component may for short intervals of time reduce below the lower predetermined working temperature or increase above the upper predetermined working temperature, sealed thermal chamber 16 operating according to the technique of FIG. 4 will tend to bring photonics component 14 to a temperature within the bounds of the lower predetermined working temperature and the upper predetermined working temperature, for example, within a relatively short recovery period. Thus, the technique of FIG. 4 may be used to substantially maintain photonics component 14 above the lower predetermined working temperature and below the upper predetermined working temperature. Thus, the operating characteristics of photonics component 14 may be maintained within an acceptable range by the technique of FIG. 4. As described above, sealed thermal chamber 16 may be a passive device in that no power or control signals are provided to sealed thermal chamber 16, and sealed thermal chamber 16 changes thermal conductivity based on the temperature of material 20.

Various examples have been described. These and other examples are within the scope of the following claims.

The invention claimed is:
1. An article comprising:
an optical transceiver package, the optical transceiver package comprising:

a photonics component mounted in the optical transceiver package, wherein the photonics component is configured to generate heat in an operational state; and a sealed thermal chamber configured to maintain the photonics component between a lower predetermined working temperature and a higher predetermined working temperature, wherein the sealed thermal chamber comprises a material that exhibits a first thermal conductivity below a lower predetermined threshold temperature and a second thermal conductivity higher than the first thermal conductivity above an upper predetermined threshold temperature.

2. The article of claim 1, wherein the upper predetermined threshold temperature is greater than the lower predetermined threshold temperature by at least about 10° C.

3. The article of claim 1, wherein a temperature-dependent operating characteristic of the photonics component is within a predetermined operating range when the temperature of the photonics component is between the lower predetermined working temperature and the upper predetermined working temperature.

4. The article of claim 3, wherein the operating characteristic is a wavelength.

5. The article of claim 1, wherein the photonics component comprises one or more of a laser, a modulator, a data photodiode, a multiplexer, or a demultiplexer.

6. The article of claim 1, wherein the optical transceiver package further comprises a lid, wherein the lid comprises the sealed thermal chamber.

7. The article of claim 1, further comprising a thermal grease layer between the photonics component and a surface of the sealed thermal chamber.

8. The article of claim 1, wherein the first thermal conductivity is sufficiently low to retain at least some generated heat within the optical transceiver package such that the generated heat raises the temperature of the photonics component above the lower predetermined working temperature, and wherein the second thermal conductivity is sufficiently high to conduct at least some generated heat away from the optical transceiver package such that the temperature of the photonics component decreases to below the upper predetermined working temperature.

9. The article of claim 1, wherein the material is selected such that the lower predetermined threshold temperature is substantially the same as the lower predetermined working temperature and the upper predetermined threshold temperature is substantially the same as the upper predetermined working temperature.

10. A system comprising:
a printed circuit board; and
an optical transceiver package mounted to the printed circuit board, wherein the optical transceiver package comprises:
  a photonics component mounted in the optical transceiver package, wherein the photonics component is configured to generate heat in an operational state; and
  a sealed thermal chamber configured to maintain the photonics component between a lower predetermined working temperature and a higher predetermined working temperature, wherein the sealed thermal chamber comprises a material that exhibits a first thermal conductivity below an lower predetermined threshold temperature and a second thermal conductivity higher than the first thermal conductivity above an upper predetermined threshold temperature.

11. The system of claim 10, wherein a temperature-dependent operating characteristic of the photonics component is within a predetermined operating range when the temperature of the photonics component is between the lower predetermined working temperature and the upper predetermined working temperature.

12. The system of claim 10, further comprising:
a photonics interface configured to communicate with a network, the photonics interface comprising the optical transceiver package;
a modem mounted to the printed circuit board, the modem configured to communicate with the photonics interface; and
a processor mounted to the printed circuit board, the processor configured to communicate with the modem and the photonics interface.

13. The system of claim 11, further comprising a particle beam splitter and an optical hybrid mixer mounted to the printed circuit board, wherein the photonics interface comprises the particle beam splitter and the optical hybrid mixer, wherein the photonics component and the particle beam splitter is configured to communicate with the optical hybrid mixer.

14. The system of claim 10, wherein the photonics component comprises one or more of a laser, a modulator, a data photodiode, a multiplexer, or a demultiplexer.

15. The system of claim 10, wherein the optical transceiver package further comprises a lid, wherein the lid comprises the sealed thermal chamber.

16. A method comprising:
operating a photonics component mounted in an optical transceiver package, wherein the optical transceiver package comprises a sealed thermal chamber comprising a material, wherein the photonics component generates heat in an operational state;
retaining the generated heat within the optical transceiver package to raise the photonics component above a lower predetermined working temperature when the material is below a lower predetermined threshold temperature, wherein the material exhibits a first thermal conductivity below the lower predetermined threshold temperature; and
conducting the generated heat away from the optical transceiver package to lower the photonics component below an upper predetermined working temperature when the material is above an upper predetermined threshold temperature, wherein the material exhibits a second thermal conductivity higher than the first thermal conductivity above the lower predetermined threshold temperature.

17. The method of claim 16, wherein the upper predetermined threshold temperature is greater than the lower predetermined threshold temperature by at least about 10° C.

18. The method of claim 16, wherein the material is selected such that the lower predetermined threshold temperature is substantially the same as the lower predetermined working temperature and the upper predetermined threshold temperature is substantially the same as the upper predetermined working temperature.

19. The method of claim 16, wherein the first thermal conductivity is sufficiently low to raise the photonics component above the lower predetermined working temperature, and wherein the second thermal conductivity is sufficiently high to lower the photonics component below the upper predetermined working temperature.

20. The method of claim 16, further comprising maintaining a temperature-dependent operating characteristic of the photonics component within a predetermined operating range by maintaining the photonics component between the lower predetermined working temperature and the upper predetermined working temperature.

\* \* \* \* \*